United States Patent
Sebo

(10) Patent No.: US 9,820,471 B2
(45) Date of Patent: Nov. 21, 2017

(54) CHEST HARNESS WITH AN ELASTIC CHEST STRAP

(71) Applicant: Julius-K9, LLC, Riverview, FL (US)

(72) Inventor: Gyula Sebo, Szigetszentmiklós (HU)

(73) Assignee: JULIUS-K9 LLC, Tampa, FL (US)

( * ) Notice: Subject to any disclaimer, the term of this patent is extended or adjusted under 35 U.S.C. 154(b) by 0 days.

(21) Appl. No.: 14/630,493

(22) Filed: Feb. 24, 2015

(65) Prior Publication Data

US 2015/0282455 A1  Oct. 8, 2015

(30) Foreign Application Priority Data

Feb. 25, 2014 (HU) .................................. P 1400100

(51) Int. Cl.
*A01K 27/00* (2006.01)

(52) U.S. Cl.
CPC .................................. *A01K 27/002* (2013.01)

(58) Field of Classification Search
CPC ..................................................... A01K 27/002
USPC .................................. 119/863, 865, 856, 850
See application file for complete search history.

(56) References Cited

U.S. PATENT DOCUMENTS

| 5,165,222 | A | * | 11/1992 | Cohen | A01K 13/006 40/303 |
| 6,085,500 | A | * | 7/2000 | Keppick | B68B 1/04 119/798 |
| 6,467,437 | B2 | * | 10/2002 | Donovan | A01K 27/005 119/719 |
| D682,486 | S | * | 5/2013 | Sebo | A61D 9/00 D30/152 |
| 8,627,788 | B2 | * | 1/2014 | Sebo | A01K 13/006 119/792 |
| 9,655,344 | B1 | * | 5/2017 | Sebo | A01K 27/002 |
| 2001/0015179 | A1 | * | 8/2001 | Fountoulakis | A01K 27/001 119/770 |
| 2002/0005175 | A1 | * | 1/2002 | Donovan | A01K 27/005 119/798 |
| 2005/0072377 | A1 | * | 4/2005 | Wanveer | A01K 15/02 119/856 |
| 2006/0065210 | A1 | * | 3/2006 | Tozawa | A01K 27/005 119/863 |

(Continued)

FOREIGN PATENT DOCUMENTS

| AT | 12593 U1 | * | 8/2012 | ............ A01K 27/002 |
| AT | 13045 U1 | * | 5/2013 | ............ A01K 13/006 |

(Continued)

*Primary Examiner* — Joshua D Huson
(74) *Attorney, Agent, or Firm* — Hershkovitz & Associates, PLLC; Abe Hershkovitz

(57) ABSTRACT

The invention relates to a quick release chest harness with an elastic chest strap, developed for four-legged mammals, comprising a back strap, a leash ring fixed on it for attaching a leash, a belly strap equipped with a quick release buckle, and a chest strap running between the chest bone and the throat area. An element implemented for the chest strap of the chest harness, capable of limited stretching over a given section, is suitable for significantly reducing the risk of injury caused by sudden loads on the chest of the animal during use. Due to the low load-bearing capacity of the elastic portion, the extent of stretching of the chest strap is limited by a separate element, an element limiting the stretching of the elastic portion.

4 Claims, 4 Drawing Sheets

(56) References Cited

U.S. PATENT DOCUMENTS

| | | | |
|---|---|---|---|
| 2006/0156997 A1* | 7/2006 | Moore | A01K 27/002 |
| | | | 119/792 |
| 2006/0196447 A1* | 9/2006 | Poh-Beyerlein | A01K 23/00 |
| | | | 119/869 |
| 2007/0044735 A1* | 3/2007 | Zimmerman | 119/856 |
| 2008/0134991 A1* | 6/2008 | DePass | A01K 27/002 |
| | | | 119/856 |
| 2008/0276880 A1* | 11/2008 | Swisher | A01K 27/002 |
| | | | 119/728 |
| 2010/0263602 A1* | 10/2010 | Cho | A01K 27/002 |
| | | | 119/792 |
| 2010/0319633 A1* | 12/2010 | Moncheski | A01K 23/00 |
| | | | 119/869 |
| 2011/0000440 A1* | 1/2011 | Mucerino, Jr. | A01K 27/005 |
| | | | 119/709 |
| 2011/0226193 A1* | 9/2011 | Williams | A01K 23/00 |
| | | | 119/850 |
| 2013/0327282 A1* | 12/2013 | Sebo | A01K 13/006 |
| | | | 119/850 |
| 2014/0041599 A1* | 2/2014 | Sebo | B63C 9/115 |
| | | | 119/850 |
| 2017/0150700 A1* | 6/2017 | Sebo | A01K 27/002 |

FOREIGN PATENT DOCUMENTS

| | | | |
|---|---|---|---|
| DE | 202010006992 U1 * | 8/2010 | A01K 27/00 |
| EP | 2674029 A2 * | 12/2013 | A01K 13/006 |

* cited by examiner

CHEST HARNESS WITH AN ELASTIC CHEST STRAP

FIELD OF THE INVENTION

The present invention relates to a quick release chest harness with an elastic chest strap, developed for four-legged mammals, comprising a back strap, a leash ring fixed on it for attaching a leash, a belly strap equipped with a quick release buckle, and a chest strap running between the chest bone and the throat area. The chest strap is attached at the connection of the back strap and the belly strap on both sides of the harness. There is a connecting element between the chest strap and the back strap, connecting them at an angle. The chest strap is elastic, capable of stretching over at least one given section and to a given extent, reducing the load on the shoulders of the dog or any other mammal kept as a pet. With the belly strap equipped with a quick release buckle, the harness is practical for everyday use, for example for securing in a car.

BACKGROUND OF THE INVENTION

The chest harnesses disclosed in the prior art, with the relegation of pulling or driving horses to be background, were developed primarily for dogs, as they are an ideal solution for leading a dog on a leash, holding it back, and for distributing the pressure caused by the acting forces.

The chest harnesses found in the prior art are dog harnesses comprising leather and/or textile straps, padded on the back part, chest part and belly part of the dog in a fixed, or sometimes in a releasable manner. These dog chest harnesses are also called "saddle-harnesses", when the padded part resting on the back of the dog covers the back like a saddle. The purpose of padding is to distribute the pressure, to stabilize the straps, and to allow the attachment and display of additional equipment (e.g. bag, light, GPS or camera devices) and/or graphic elements, high visibility colours, labels on the padding itself, or on the cover thereof. The straps covering the belly part and the chest bone part (comparable to the chest strap and the belly strap components of the present invention) are subjected to increased stress when the dog is lead on a leash, or during training and police work. On dog chest harnesses according to the prior art, these straps are fixed together, incapable of stretching (form-stable) to any substantial extent. They are made by weaving processes (by interlacing warp yarns and weft yarns) used regularly in the textile industry, usually from synthetic (PE, PP, PA) fibres. These straps retain their length under load. Their stretchability or elasticity is far below that of rubber, silicone or elastomer materials, and their stretching leads to a permanent reduction in load-bearing capacity, or breaking. In fact, the bones of developing young dogs especially need to be spared from strong impacts. This includes even the load resulting from the daily walk on a leash. The padding of the chest strap and/or the belly strap is only a partial solution, because a sudden force, a shock-like load on the straps, is not sufficiently reduced by the padding material.

The chest straps of dog harnesses preferably consist of at least two parts, but there are also undivided, non-adjustable chest straps made of one strap connecting the two sides of the harness and also the two ends of the back strap in continuation thereof.

A common chest strap design for dog harnesses is one that is divided into two main parts, adjustable by a hook-and-loop fastener by threading through a fastener/slide adjuster. This is a Hungarian development from 1997, and was introduced into regular use first for Austrian, then for German service dog units under the name "K9-Powerharness" (DE302009060989). As the name of the device already suggests, it was designed for high loads occurring, especially in the case of dogs. The success of the dog harness lies in being practical such as being quick to put on and take off.

In such a known dog harness, the chest strap, attached to the connection point of the back strap and/or the belly strap in continuation thereof on one side of the dog harness, ends in a cut edge, while on the other side, it preferably ends in an oval fastener/slide adjuster. The cut edge section of the chest strap is positioned for use by threading it through this fastener/slide adjuster and closing on itself. Thus in this case, the chest strap is divided into two parts, one section on one side of the dog harness, extending from the connection point of the belly strap and/or back strap, which is the chest strap part holding the fastener/slide adjuster, while another section on the other side of the dog harness is threaded through the fastener/slide adjuster during use. This adjustable chest strap section extends from the connection point of the adjustable-length chest strap part and the back strap and/or the belly strap and is equipped with a hook and loop fastener so it can close on itself. In the prior art, pressure distributors for chest straps are attached to the hook-and-loop fastener of the adjustable-length chest strap part, the adjustable-length chest strap part of the chest strap closing on itself, and/or to the chest strap itself, by threading onto it.

Utility model No. U10 00003, disclosing a chest pad made of a foam material, describes a pressure distributor that is not only threaded onto the chest strap of a chest harness, but is also attached to the hook-and-loop fastener thereof. The chest pad makes it much easier for the dog to tolerate being lifted, e.g., by the handle fixed on the harness. In the event of a sudden load in the direction of movement, the chest of the dog is supported by the whole width of the surface of the chest pad, but it will not stretch to a given extent. Therefore its load-absorbing capacity is low.

Utility model No. U11 00245, disclosing a so called "I"-strap, also describes the padding of the chest, or the chest strap of the dog harness, as well as the dog collar. This pressure distribution device is mounted on the chest strap in a releasable manner, perpendicular to the chest strap and connected to the chest strap and the belly strap of the harness. At the same time, it can be connected to the collar as well. The significance of the device is that, by fixing three points together, the use of the harness becomes safer, for example, for service/assault dogs, as it prevents the chest strap of the dog harness from sliding down towards the forelegs of the dog during vigorous movement. However, it does not affect to a large extent the load on the chest part and the shoulder joints of the animal. Nevertheless, the significance of the device is indisputable, as the "I"-strap was the first elastic pressure distribution element mountable on dog chest harnesses in a releasable manner, since it is connected to the collar by means of a rubber ring. The limitation of stretching was not implemented for the elastic portion connected to the dog collar. The development and spread of pressure distribution devices mountable on dog chest harnesses among hobby dog owners clearly proves that there is a demand for such products, and in fact their use solves a major problem. In the case of pulling harnesses made for horses, there are no known elastic pressure distribution elements, operated/fastened by means of a hook-and-loop fastener and rubber solution.

The disadvantage of all three devices described above however, is that, to use them, the hook-and-loop fasteners need to be opened/closed, and the chest strap also needs to be partially opened. The dog chest harness known in the prior art, due to its chest strap being incapable of elastic stretching, cannot be used for mammals having a chest with a genetically different anatomy from that of dogs. Harnesses can and should be used for cats and even for rabbits kept as pets, as the use of a collar can choke the animal. For safely securing the harness, the animal should be prevented from jumping or stepping over the chest strap with its forelegs. This risk exists not only in the case of cats and rabbits, but some agile dog breeds as well. The harnesses used in the prior art for such animals are not chest harnesses, and therefore, they are more complicated to put on and take off, even if quick release buckles are used as fixing elements.

Patent No. US2007/0034164A1 discloses a development where, on the chest part of an elastic harness, to be used only for dogs, the continuity of the load-bearing (non-elastic) straps is interrupted by an elastic insert. The biggest disadvantage of such a development is that no element covering the elastic elements, limiting their stretching, is provided for the dog harness, to perform a load-bearing function, and to limit the stretching of the elastic portion. Therefore, permanent and deforming stretching of the elastic portion is inevitable, and its breakage can be avoided only by using oversized, excessively thick elastic elements.

SUMMARY OF THE INVENTION

The aim of the present invention is to improve the chest harness suitable for securing four-legged mammals, primarily dogs, e.g., in a car or during police work, to include an elastic chest strap and/or a chest strap capable of elastic stretching over a given section, protecting the shoulder joints of an animal wearing the harness. Another aim is to eliminate the disadvantages of the harnesses taught in the prior art, to increase the pressure distribution effect without any special adjustment and/or mounting work on the part of the user. Still another aim is to make the chest harness also suitable for other mammals kept as pets with a different chest anatomy from that of dogs, by making the elastic chest strap always close fitting during movement.

The present invention is based on the recognition that, e.g., in the event of a car accident, or the special carrying or descending of service dogs, such forces act on the chest of the animal that the pressure distributors, elastic harnesses disclosed in the prior art, cannot sufficiently compensate, or in some cases, endure without deformation. An element capable of limited stretching over a given section can be implemented for the chest strap of the chest harness, and is suitable for significantly reducing the risk of injury caused by sudden loads on the chest of the animal during use. Due to the low load-bearing capacity of the elastic portion, the extent of stretching of the chest strap should be limited by a separate element.

It is further recognized that the quick release chest harness is very easy to put on and take off in the case of other mammals as well, but due to the fixed chest strap incapable of elastic stretching, the animal can jump over it with its forelegs and get loose from the harness, or get entangled in it. This risk exists especially in the case of animal species with a chest anatomy significantly different from that of dogs (e.g., rabbits and cats). If the stretching of the chest strap is not properly maximized, then certain breeds of dogs can also get loose from the harness. If a separate element does not take over the load from the elastic portion of the chest strap, then it will wear out prematurely, and will pose a risk of injury to the dog.

Thus, the present invention relates to a chest harness with an elastic chest strap, developed for four-legged mammals, comprising at least one back strap with at least one leash ring, a chest strap, the ends of which are connected to the back strap in the area of the two shoulder joints and surrounding the chest of the animal. At least one adjustable-length, openable belly strap is in continuation of the back strap and surrounds the chest of the animal from below. At least one connecting element, closing an angle of less then 85 degrees with the chest strap, connects the chest strap to the back strap in a fixed manner in the direction of the leash ring.

The essence of the development is that the chest strap of the chest harness with an elastic chest strap has at least one elastic portion, the maximum stretching of which is determined by an element limiting the stretching of the elastic portion.

The element limiting the stretching of the elastic portion is most preferably a strap.

The element limiting the stretching of the elastic portion is most preferably formed from the chest strap part holding the fastener/adjuster ring.

The elastic portion and the element limiting the stretching of the elastic portion preferably pass through the fastener/adjuster ring.

The elastic portion is preferably a strap containing rubber threads.

BRIEF DESCRIPTION OF THE DRAWINGS

The chest harness with an elastic chest strap according to the present invention is shown in the following figures.

DETAILED DESCRIPTION OF THE INVENTION

Figure 1:
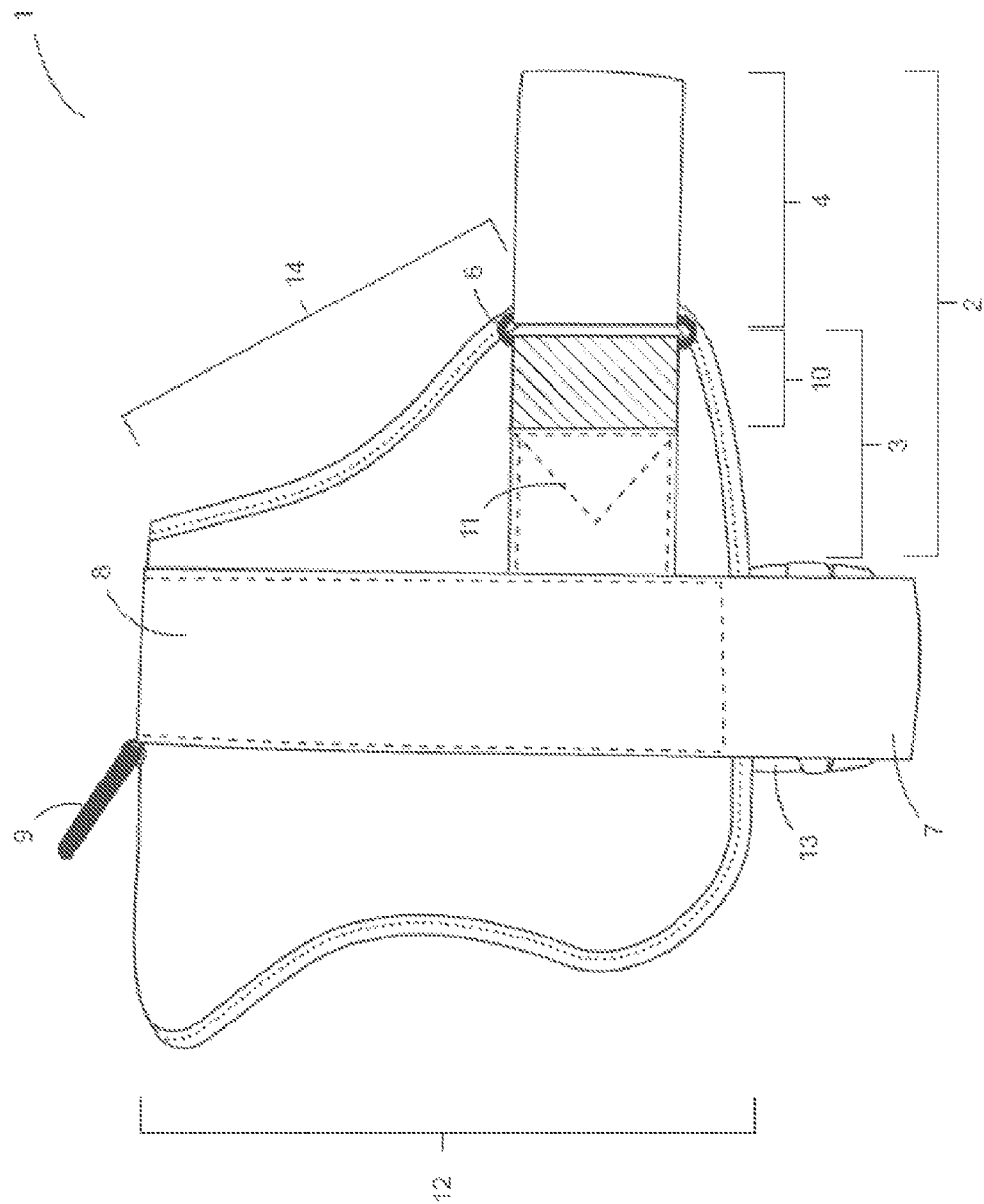
FIG. 1 shows a lateral view of the chest harness with an elastic chest strap according to the claimed invention, with an elastic portion included in the chest strap part holding the fastener/adjuster ring, with the element limiting the stretching of the elastic portion removed.

FIG. 1 shows a lateral view of the chest strap 2 of the chest harness with an elastic chest strap 1. As it is shown, the chest strap 2 is divided into two main parts, a chest strap part 3 holding a fastener/adjuster ring 6, and an adjustable-length chest strap part 4. The chest strap part 3 ends in a fastener/adjuster ring 6, which is preferably an oval metal ring. The adjustable-length chest strap part 4 is connected to the chest strap part 3 by threading through it. The fastener/adjuster ring 6 is fixed to the elastic portion 10 formed in the continuation of the chest strap part 3 preferably by sewing 11. The fold-back 10 is made of an elastic material, most preferably a rubber strap, ensuring the elastic stretching of the chest strap 2. If the stretching of the rubber strap is not limited by a separate element, the premature wearing out and breaking of the rubber threads is inevitable. The chest harness with an elastic chest strap 1 furthermore comprises a buckle portion 13 fixed to the belly strap 7. The belly strap 7 is formed in the continuation of the back strap 8. The chest strap 2 is attached at the connection of the belly strap 7 and the back strap 8. The chest strap 2 is connected to the back strap 8 by a connecting element 14 in a non-releasable manner. The connecting element 14 is a strap and in the given case forms the edge of the saddle part 12, and is essential for stability, for the load-bearing capacity. When the saddle part 12 is omitted, the connecting element 14 is preferably a strap and runs around the neck of the dog. At least one leash ring 9 is fixed on the back strap 8.

Figure 2:
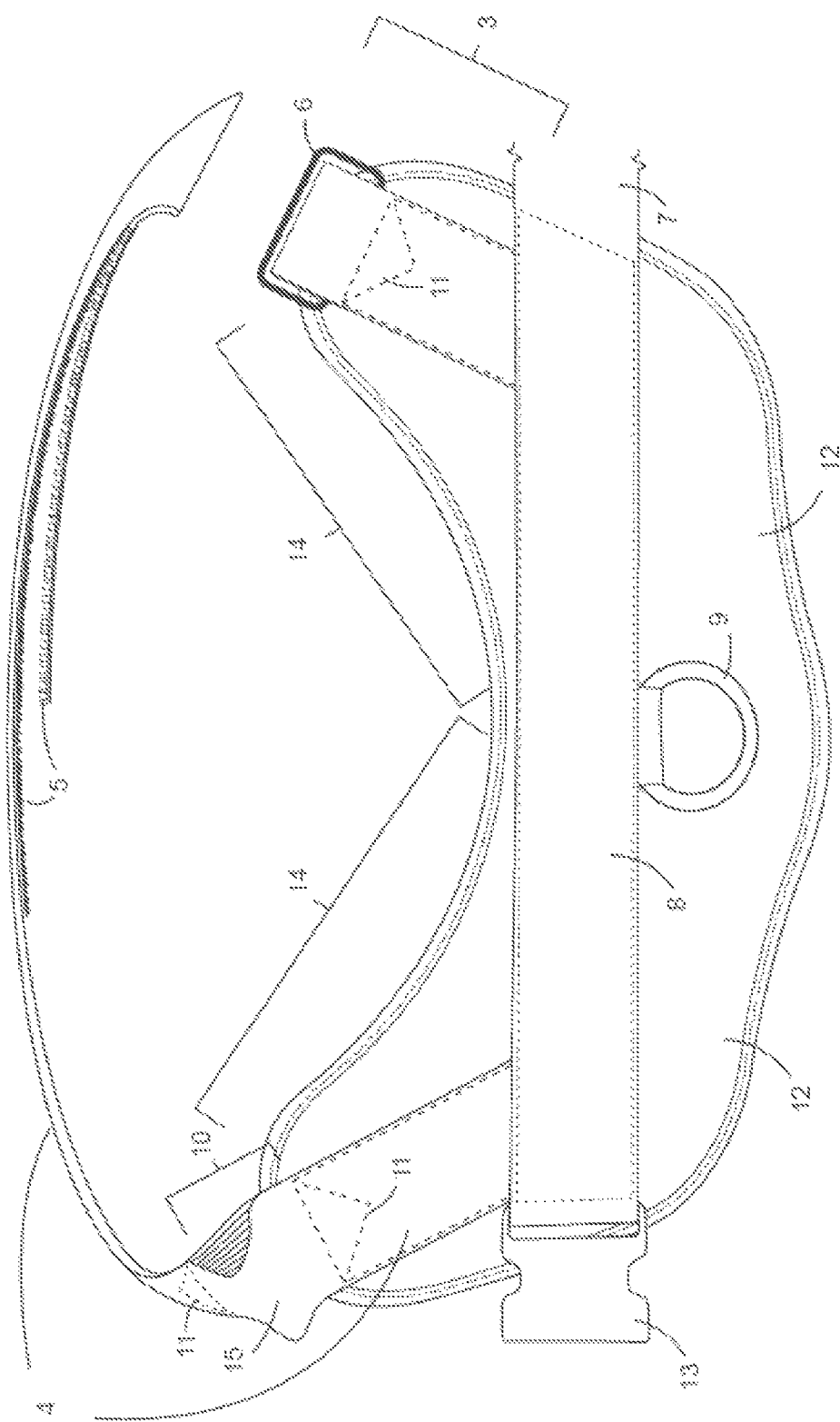
FIG. 2 shows a top view of the chest harness with an elastic chest strap, with an elastic portion included in the adjustable-length chest strap part as well, the stretching of which is limited by a heavy-duty element limiting the stretching of the elastic portion. In the chest strap portion holding the fastener/adjuster ring, the element limiting the stretching of the elastic portion passes through the fastener/adjuster ring with the elastic portion.

FIG. 2 shows a top view of the chest harness with an elastic chest strap 1, equipped with a saddle part 12, in a preferred embodiment. As it is shown, the chest harness with an elastic chest strap 1 comprises a chest strap part 3 holding a fastener/adjuster ring 6, and passing through it. An adjustable-length chest strap part 4 is threaded through the fastener/adjuster ring 6 and closed on itself by means of a chest strap hook-and-loop fastener 5. The chest strap part 3 holding the fastener/adjuster ring 6 and the adjustable-length chest strap part 4 of the chest harness with an elastic chest strap 1 end in the belly strap 7 and/or the back strap 8. The belly strap 7 has a buckle portion 13, and there is a leash ring 9 fixed on the back strap 8. The chest strap part 3 holding the fastener/adjuster ring 6 and the adjustable-length chest strap part 4 are connected to the back strap 8 by a connecting element 14, which in this case is curved and is formed by a given section of the saddle part 12. The adjustable-length chest strap part 4 is not threaded through the fastener/adjuster ring 6 in a ready-for-use state.

In FIG. 2, the adjustable-length chest strap part 4 and the chest strap part 3 holding the fastener/adjuster ring 6 of the chest strap 2 are both elastic. In the case of the adjustable-length chest strap part 4, an elastic portion 10 capable of elastic stretching and of a length of preferably 1-10 cm in the non-stretched state is fixed most preferably directly to the saddle part 12 by sewing 11. This elastic portion 10 is most preferably a rubber strap of the same width as that of the adjustable-length chest strap part 4, along the whole length of which the adjustable-length chest strap part 4 is bulging out. The bulging part forming a part of the adjustable-length chest strap part 4 is the element 15 limiting the stretching of the elastic portion.

Figure 3:
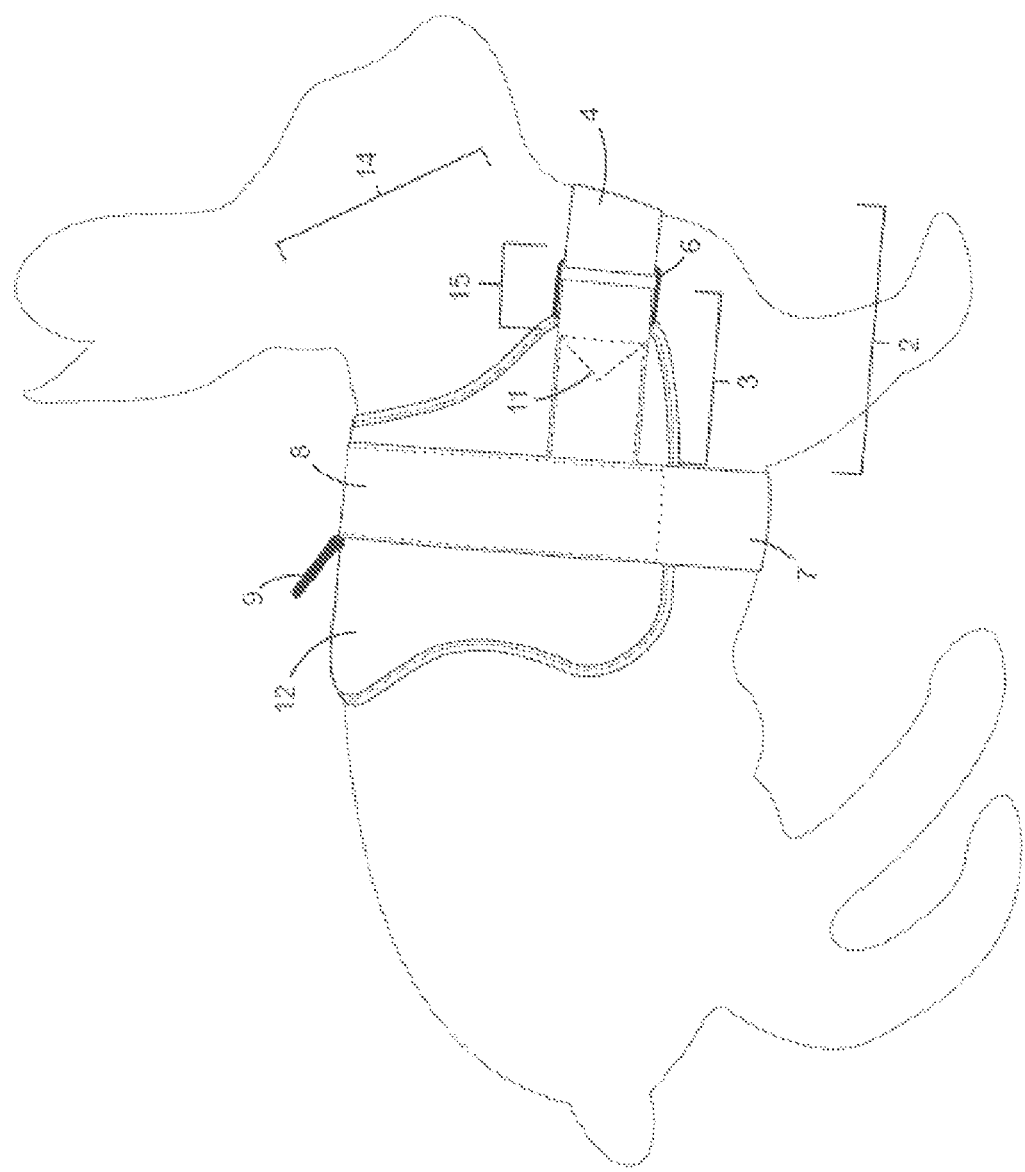
FIG. 3 shows a saddle-type design of the chest harness with an elastic chest strap on a rabbit, with the stretching of the elastic portion of the chest strap limited by the limiting element.

In FIGS. 2 and 3, the chest strap part 3 holding the fastener/adjuster ring 6 is elastic and has an element 15 limiting the stretching of the elastic portion which passes through the fastener/adjuster ring 6. The element 15 limiting the stretching of the elastic portion is formed from the chest strap part 3 holding the fastener/adjuster ring 6, in the continuation thereof, separated from it by sewing 11.

FIG. 3 shows the chest harness with an elastic chest strap 1 on a rabbit, with a closed elastic chest strap 2. In both FIGS. 3 and 4, an element 15 limiting the stretching of the elastic portion is formed in the continuation of the chest strap part 3 of the chest strap 2, separated from the chest strap part 3 by sewing 11. The adjustable-length chest strap part 4 is threaded through the fastener/adjuster ring 6 in a ready-for-use state. In both FIGS. 3 and 4, the continuation of the back strap 8 forms the belly strap 7. The back strap 8 and a part of the chest strap 2 are padded by the saddle part 12, and the chest strap 2 and the back strap 8 are connected together by a connecting element 14.

Figure 4:
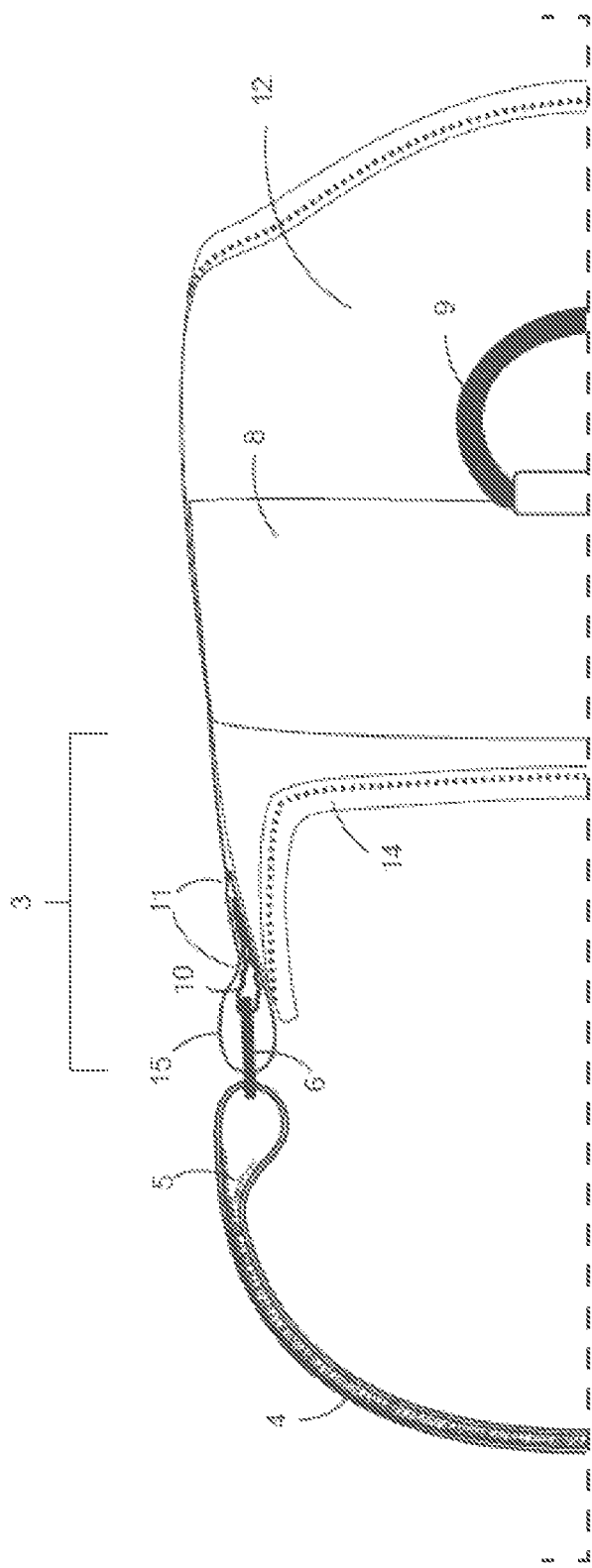
FIG. 4 shows a top view of the elastic portion and the element limiting the stretching of the elastic portion on both sides of the fastener/adjuster ring in a preferred embodiment.

FIG. 4 shows a top view that both the elastic portion 10 and the element 15 limiting the stretching of the elastic portion pass through the fastener/adjuster ring 6. The adjustable and openable adjustable-length chest strap part 4 equipped with a chest strap hook-and-loop fastener 5 is also threaded through a portion of the fastener/adjuster ring 6. The stretching of the elastic portion 10 is limited by the element 15 limiting the stretching of the elastic portion. The element 15 is most preferably formed from the chest strap part 3 and surrounds the elastic portion 10, covering it from a lateral view, and fixed to it by sewing 11.

The chest harness with an elastic chest strap, equipped with an element limiting the stretching of the elastic portion, preferably implemented as a bulging part of the chest strap, ensures a safe and convenient way for leading on a leash and securing dogs and some other four-legged mammals. It is perfectly suitable for absorbing sudden, shock-like forces experienced, e.g., in a car accident, for protecting the affected joints. Due to the element limiting the stretching of the elastic portion, the elastic portion becomes capable of tolerating the acting forces without deformation in the long-term, and of giving reliable tensile testing results.

LIST OF REFERENCE NUMBERS 1. chest harness with an elastic chest strap
2. chest strap
3. chest strap part holding the fastener/adjuster ring
4. adjustable-length chest strap part
5. chest strap hook-and-loop fastener
6. fastener/adjuster ring
7. belly strap
8. back strap
9. leash ring
10. elastic portion
11. sewing
12. saddle part
13. buckle portion
14. connecting element
15. element limiting the stretching of the elastic portion While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A chest harness with an elastic chest strap for a four-legged animal, comprising:
    a saddle comprising a first side, a second side, and middle section there between, at least one back strap on said saddle and extending from said first side to said second side, and at least one leash ring on said back strap,
    a chest strap comprising at least two parts:
    a first chest strap part holding a fastener adjuster ring at a first end thereof, a second end of said first chest strap part connected to said back strap by at least one connecting element in a fixed manner at a location adjacent to one of shoulder joints of said four-legged animal when the saddle is positioned on the animal; and a second chest strap part comprising a first end configured to pass at least a portion of the second chest strap part through said fastener adjuster ring of the first chest strap, a second end of said second chest strap part connected to said back strap by said at least one connecting element in a fixed manner at a location adjacent to the other of the shoulder joints of said four legged animal when the saddle is positioned on the animal, wherein said second chest strap part further comprises a fastening assembly comprising:

a first fastener positioned at said first end of the second chest strap;

a second fastener positioned between the first end and second end of the second chest strap part;

wherein said second chest strap part first end is configured to pass thru the fastener adjuster ring to tighten and adjust said chest strap relative to said four-legged animal, the second chest strap part being configured to be secured back onto itself by connecting said first fastener positioned at said first end of the second chest strap to said second fastener of the second chest strap part providing folded releasable engagement of the second chest strap back onto itself when in use;

at least one adjustable-length belly strap formed as a continuation of said back strap, said adjustable-length belly strap having a first end extending beyond one of said first side or said second side of the saddle part and formed of a length configured to wrap around the underside of the four legged animal and further comprising a first releasable fastener at said first end of said adjustable-length belly strap and connecting said first releasable fastener to a second releasable fastener attached to the back strap adjacent the opposite side of the saddle part thereby surrounding the midsection of said four-legged animal from below;

a first elastic chest strap portion having a length with a first end attached to the saddle and a second end attached to and in overlapping engagement with said second chest strap part at a location adjacent to said second chest strap part second end, wherein a maximum stretching of the first elastic chest strap portion is limited by a first limiting element, said first limiting element configured to limit the stretching of said first elastic chest strap portion, wherein said first limiting element is formed from a portion of said second chest strap part that is longer than the first elastic chest strap portion in an unstretched state, so as to form a bulged length of said second chest strap part that is affixed to said first elastic chest strap portion at its first and second ends;

wherein said first chest strap holding the fastener adjuster ring also includes at least a second elastic portion passing through the fastener adjuster ring and looping back to be connected between said first chest strap part holding the fastener adjuster ring and the saddle, the maximum stretching of the second elastic portion being determined by a second limiting element limiting the stretching of the second elastic portion, such that said second limiting element surrounds said second elastic portion in a loose, loop-like part, and passes through the fastener adjuster ring together with the second elastic portion, and the second limiting element is formed from the first chest strap part holding the fastener adjuster ring in a continuation thereof.

2. The harness according to claim 1, wherein the at least one connecting element attaches the chest strap to the back strap of the saddle at an angle of less than 85 degrees with the chest strap to assist in limiting inadvertent escape of an animal from the harness.

3. The harness according to claim 1, wherein the first elastic chest strap portion is a strap containing rubber threads.

4. The harness according to claim 1, wherein said second elastic portion is connected between said first chest strap part and the saddle by sewing.

\* \* \* \* \*